United States Patent
Kaczinski

(10) Patent No.: US 12,405,060 B2
(45) Date of Patent: Sep. 2, 2025

(54) ROTARY KILN AND METHOD FOR BURNING CARBONATE-CONTAINING MATERIAL, IN PARTICULAR LIMESTONE OR DOLOMITE

(71) Applicant: S.A. Lhoist Recherche et Développement, Ottignies-Louvain-la-Neuve (BE)

(72) Inventor: Carsten Kaczinski, Dortmund (DE)

(73) Assignee: S.A. Lhoist Recherche et Développement, Ottignies-Louvain-la-Neuve (BE)

( * ) Notice: Subject to any disclaimer, the term of this patent is extended or adjusted under 35 U.S.C. 154(b) by 0 days.

(21) Appl. No.: 18/280,377

(22) PCT Filed: Mar. 7, 2022

(86) PCT No.: PCT/EP2022/055693
§ 371 (c)(1),
(2) Date: Sep. 5, 2023

(87) PCT Pub. No.: WO2022/184934
PCT Pub. Date: Sep. 9, 2022

(65) Prior Publication Data
US 2024/0151468 A1    May 9, 2024

(30) Foreign Application Priority Data
Mar. 5, 2021   (EP) ..................................... 21161137

(51) Int. Cl.
*F27B 7/16*     (2006.01)
*C04B 7/43*     (2006.01)
(Continued)

(52) U.S. Cl.
CPC .............. *F27B 7/161* (2013.01); *C04B 7/432* (2013.01); *C04B 7/44* (2013.01); *F27B 7/10* (2013.01);
(Continued)

(58) Field of Classification Search
CPC ... C04B 7/432; C04B 7/44; F27B 7/10; F27B 7/161; F27B 7/162; F27B 7/224; Y02P 40/40
(Continued)

(56) References Cited

U.S. PATENT DOCUMENTS

| 1,544,504 A | 6/1925 | Tomlinson |
| 2,506,739 A | 5/1950 | Raypholtz |

(Continued)

FOREIGN PATENT DOCUMENTS

| CN | 209027271 U | 6/2019 |
| DE | 400236 C | 8/1924 |

(Continued)

OTHER PUBLICATIONS

FR 443783 A—Translation (Year: 1912).*

*Primary Examiner* — Steven B Mcallister
*Assistant Examiner* — Benjamin W Johnson
(74) *Attorney, Agent, or Firm* — The Webb Law Firm

(57) ABSTRACT

The present invention relates to a rotary kiln for burning carbonate-containing material, in particular limestone or dolomite, including a rotary tube having an inlet end for feeding the material to be burned and an outlet end for discharging the burnt material, and a burner unit arranged in the region of the outlet end, the rotary tube having an inlet zone at its inlet end and an outlet zone at its outlet end, a preheating zone and a combustion zone being arranged between the inlet zone and outlet zone in the direction of transport of the material. The rotary kiln is characterized (Continued)

according to the invention in that at least one projection is arranged in the outlet zone of the rotary tube, the at least one projection having a contour tapering in the direction of rotation of the rotary tube. The present invention further relates to a method for burning carbonate-containing material, in particular limestone or dolomite.

15 Claims, 9 Drawing Sheets

(51) Int. Cl.
- *C04B 7/44* (2006.01)
- *F27B 7/10* (2006.01)
- *F27B 7/22* (2006.01)

(52) U.S. Cl.
CPC .............. *F27B 7/224* (2013.01); *F27B 7/162* (2013.01); *Y02P 40/40* (2015.11)

(58) Field of Classification Search
USPC ........................................................ 432/111
See application file for complete search history.

(56) References Cited

U.S. PATENT DOCUMENTS

| | | | |
|---|---|---|---|
| 2,939,693 A | 6/1960 | Old et al. | |
| 3,124,338 A * | 3/1964 | Harris | F27B 7/162 |
| | | | 432/118 |
| 3,758,089 A | 9/1973 | Kocks | |
| 4,038,021 A | 7/1977 | Benson | |
| 4,136,965 A * | 1/1979 | Sunnergren | F27B 7/162 |
| | | | 432/118 |
| 4,307,520 A | 12/1981 | Lutz | |
| 4,338,732 A | 7/1982 | Coxhill | |
| 4,459,921 A | 7/1984 | Unger | |
| 4,475,886 A * | 10/1984 | Tyler | F27B 7/162 |
| | | | 432/118 |
| 4,813,784 A | 3/1989 | Musil | |
| 5,083,382 A | 1/1992 | Brashears | |
| 5,203,693 A | 4/1993 | Swanson | |
| 5,302,118 A | 4/1994 | Renegar et al. | |
| 5,380,082 A | 1/1995 | Milstead | |
| 5,380,084 A | 1/1995 | Milstead | |
| 5,463,819 A | 11/1995 | Komori | |
| 5,480,226 A | 1/1996 | Milstead | |
| 5,515,620 A | 5/1996 | Butler | |
| 5,623,883 A | 4/1997 | Davidson et al. | |
| 5,873,714 A | 2/1999 | Mosci | |
| 5,975,752 A | 11/1999 | Doerksen | |
| 6,164,809 A | 12/2000 | Hawkins | |
| 6,183,244 B1 | 2/2001 | Doumet | |
| 7,204,636 B2 | 4/2007 | Didion | |
| 7,452,203 B2 | 11/2008 | Laux et al. | |
| 7,811,083 B2 | 10/2010 | Bohringer et al. | |
| 8,172,448 B1 | 5/2012 | Hudman et al. | |
| 9,080,813 B1 | 7/2015 | Deckebach | |
| 2003/0165788 A1 | 9/2003 | McCarty | |
| 2004/0118006 A1 | 6/2004 | Jerzembski et al. | |
| 2007/0144112 A1 | 6/2007 | Fumalle | |
| 2016/0084574 A1 | 3/2016 | Giebelhausen et al. | |
| 2020/0049407 A1 | 2/2020 | Son et al. | |

FOREIGN PATENT DOCUMENTS

| | | | |
|---|---|---|---|
| DE | 423492 C | | 1/1926 |
| DE | 7029355 U | | 8/1972 |
| DE | 2325781 | | 11/1974 |
| DE | 69505170 T2 | | 3/1999 |
| EP | 0674145 A1 | | 9/1995 |
| EP | 3444549 A1 | | 2/2019 |
| FR | 443783 A | * | 10/1912 |
| JP | 2008122043 A | | 5/2008 |

\* cited by examiner

ROTARY KILN AND METHOD FOR BURNING CARBONATE-CONTAINING MATERIAL, IN PARTICULAR LIMESTONE OR DOLOMITE

CROSS-REFERENCE TO RELATED APPLICATIONS

This application is the United States national phase of International Application No. PCT/EP2022/055693 filed Mar. 7, 2022, and claims priority to European Patent Application No. 21161137.1 filed Mar. 5, 2021, the disclosures of which are hereby incorporated by reference in their entireties.

BACKGROUND OF THE INVENTION

Field of the Invention

The invention relates to a rotary kiln for burning carbonate-containing material, in particular limestone or dolomite, comprising a rotary tube having an inlet end for feeding the material to be burned and an outlet end for discharging the burnt material, and a burner unit arranged in the region of the outlet end, the rotary tube having an inlet zone at its inlet end and an outlet zone at its outlet end, a preheating zone and a combustion zone being arranged between the inlet zone and outlet zone in the direction of transport of the material. Furthermore, the present invention relates to a method for burning carbonate-containing material, in particular limestone and dolomite, in such a rotary kiln.

Description of Related Art

Rotary kilns for burning carbonate-containing material have been known from the prior art for decades and have proven themselves as an efficient and reliable type of furnace for continuously calcining various types of materials. The published prior art is found, for example, in EP 0 674 145 A1, U.S. Pat. No. 1,544,504 A, or U.S. Pat. No. 3,124,338 A.

A central component of a rotary kiln is a long cylindrical rotary tube (often 100 m or longer), which is typically inclined at about 2 to 7% with respect to the horizontal. The rotary cylinder rotates slowly at 0.5 to 1.5 rpm around its axis, and the material to be burned which is introduced at its inlet end by means of a screw conveyor or the like slowly moves by gravitational force through the rotary cylinder in the direction of a flame generated by a burner arranged in the region of the kiln outlet. The kiln is typically filled with the material to be burned up to about 8 to 20% of the kiln diameter. The material to be burned migrates from the inlet zone, which is usually a few meters long, to the preheating zone (sometimes also referred to as the transition zone), in which there are already temperatures of approx. 1100-1200° C., and from there into an extensive combustion zone, which is characterized by maximum temperatures of 1500-1600° C. Due to the temperature, the material to be burned is actually calcinated to a very large extent. The combustion zone is in turn followed by the outlet zone of the rotary tube, which is several meters long and in which the burnt material begins to cool down. From there, the burnt material usually falls through a shaft onto a cooling unit, for example a grate cooler. The specific lengths of the individual zones also depend on the overall length of the rotary tube and the relative position of the burner lance and the flame length.

In order to operate the kiln efficiently, high throughput rates are always sought, while at the same time it must be ensured that the calcination of the material to be burned is complete and all the carbon dioxide is removed from the material. Thorough intermixing of the material to be burned is crucial for a rapid and complete calcination.

Another problem in practical operation is the uneven temperature distribution in the burnt material, which is a direct result of the mixing characteristics of the material in a rotary kiln. Thus, an active portion of the surface of the available kiln volume forms in the material bed, which portion is actively moving during the rotation of the rotary tube and is in intensive temperature exchange with the kiln atmosphere, while a passive part underneath tends to form clusters and does not reach the surface. Accordingly, the active portion in the material bed can cool down rapidly in the outlet zone, while the passive part, due to a lack of exchange with the kiln atmosphere cooling in the outlet zone, maintains a high temperature level for a long time. This can lead to very hot burned material from the passive portion of the material bed damaging the cooling device downstream of the rotary cylinder due to overheating.

SUMMARY OF THE INVENTION

It is therefore an object of the present invention to provide a rotary kiln for burning carbonate-containing material, in particular limestone or dolomite, of the type mentioned at the outset which ensures a high material throughput and as complete a calcination as possible of the material to be burned. In particular, damage to components downstream of the rotary cylinder, in particular those for cooling the burnt material, that results from the temperature of the burnt material being too high should be avoided.

According to a first aspect of the present invention, the aforementioned object is achieved with a rotary kiln in that at least one projection is arranged in the outlet zone of the rotary tube, the at least one projection having a contour that tapers in the direction of rotation of the rotary tube.

The particular advantage of the rotary kiln according to the invention is that by arranging at least one protrusion in the outlet zone the burnt material is effectively intermixed along the entire depth of the material bed, so that an intensive temperature exchange with the kiln atmosphere which is cooling down in the outlet zone occurs not only in the active portion of the material but also in the passive portion. This in turn means that no temperature spikes occur in the material, so that temperature-related damage to the components downstream of the rotary cylinder, in particular the cooling units, is minimized by the burnt material. Because the at least one projection has a contour that tapers in the direction of rotation of the rotary tube, it moves through the material in the manner of a plow and intermixes and combs through it intensively. As a result, maximum intermixing is achieved and the division of the material bed into active and passive components is completely eliminated.

As a result of the improved cooling capacity in the outlet zone, the material throughput through the rotary kiln and thus the process efficiency can overall be increased.

According to a first advantageous embodiment of the invention, it is provided that the at least one projection contains a fireproof material. This means that it can be used even at very high temperatures without any problems. Concrete, in particular refractory concrete, as is known per se to a person skilled in the art, is particularly suitable as a refractory material.

According to the invention, the at least one projection has a contour that tapers in the direction of rotation of the rotary tube. It is preferably V-shaped, the tip of the "V" being oriented in the direction of rotation of the rotary tube and thus plowing through the burnt material to be intermixed.

The tapering contour can also be embodied by a prismatic geometry, in particular the geometry of a triangular prism, preferably an isosceles triangular prism. The geometry of a truncated pyramid is also possible, an edge of the truncated pyramid preferably being arranged in the direction of rotation of the rotary tube for the purpose of forming the contour tapering in the direction of rotation of the rotary tube. The edges of the triangular prism or the truncated pyramid can be blunted or rounded to prevent crumbling of sensitive edges in kiln operation.

To dimension the at least one projection, the applicant has carried out intensive experimental investigations. Accordingly, for the purpose of an especially thorough intermixing of the burnt material in the outlet zone of the rotary tube, the at least one projection advantageously has a height in the radial direction with respect to the rotary cylinder of between 50 mm and 500 mm, preferably between 100 mm and 300 mm and particularly preferably of approx. 200 mm, on.

Furthermore, the at least one projection can have a length in the circumferential direction of the rotary tube between 50 mm and 2000 mm, in particular between 100 mm and 1000 mm, preferably between 300 mm and 500 mm and very particularly preferably of approximately 400 mm. The maximum width of the at least one projection in the longitudinal direction of the rotary tube can be between 50 mm and 600 mm, preferably between 300 mm and 500 mm and particularly preferably approximately 400 mm.

The at least one projection provided according to the invention in the outlet zone can be permanently connected to the inner lining of the rotary tube. In order to ensure a particularly secure connection between the inner lining of the rotary tube and the projection, it is provided according to a further advantageous embodiment of the invention that the at least one projection is attached by means of a metallic anchor, in particular a welded metallic anchor, to the inner rotary kiln casing.

According to a particularly advantageous embodiment of the invention, it is provided that a plurality of projections is provided in the outlet zone, the projections being arranged in groups of 1 to 10, especially 3 to 7, preferably 4 to 6, distributed over the circumference of the rotary tube, depending on the diameter of the rotary tube. As a result, the intermixing performance and the associated more uniform cooling of the burnt material are significantly increased already in the outlet zone.

It proves to be advantageous if the projections of a group of projections are alternately offset in the longitudinal direction of the rotary tube, for example in the manner of a zigzag line. Furthermore, a plurality of groups of projections can be arranged one behind the other in the longitudinal direction of the rotary tube. Both measures further increase the effectiveness of the intermixing of the burnt material in the outlet zone.

It is further preferred that at the outlet end of the rotary tube an edge section is provided in which no projections are arranged. As a result, the intended ejection position of the burnt material in the cooler adjoining the rotary tube is not changed with respect to a rotary tube without projections, so that subsequent mounting of the projections is easily possible. Whatever the case, a uniform material bed is ensured in the cooler.

According to a further particularly advantageous embodiment of the invention, it is provided that a plurality of further projections is arranged in the preheating zone of the rotary tube, the further projections being arranged one behind the other as groups essentially parallel to the longitudinal axis of the rotary tube. This results in a greatly improved mixing of the material to be burned and thus a faster calcination with the same time intervals, since due to the thorough mixing not just material at the surface but also material located in the interior of the material bed is exposed to high calcination temperatures and thus can be calcined faster.

According to a particularly advantageous development of the above embodiment, it can be provided that further projections of adjacent groups of further projections arranged adjacent to one another in the circumferential direction of the rotary tube are arranged offset to one another in the longitudinal direction of the rotary tube, such that spiral-shaped transport paths for the material to be burned are formed in the preheating zone. This enables comparatively faster transportation of the material to be burned through the rotary tube and in combination with the improved mixing of the material leads overall to a higher kiln throughput and thus increases the efficiency of the combustion process.

Because of the very high temperatures already prevailing in the preheating zone, it is preferred here that at least some, preferably all, of the further projections each contain a refractory material. These can be various high-temperature resistant materials, as are known per se from the prior art. Concrete, in particular refractory concrete, has proven to be particularly suitable.

In experiments by the applicant, various geometries have proven to be suitable for the further projections provided according to the invention in the preheating zone. Prismatic geometries, in particular in the form of a trapezoidal prism, especially an isosceles trapezoidal prism, are preferred. Such a trapezoidal prism is preferably aligned parallel to the longitudinal extent of the rotary tube and accordingly has two leg surfaces inclined with respect to the radius of the rotary tube. These can include an angle relative to the trapezoidal base between 35° and 75° and preferably between 60° and 70°. The length of such a trapezoidal prism in the longitudinal direction of the rotary tube is preferably approximately 400 mm and the height is preferably approximately 200 mm. In the case of a trapezoidal configuration, the width of the lower trapezoidal base is preferably approximately 200 mm and the width of the upper base is preferably approximately 100 mm.

According to a further advantageous embodiment of the invention, it is provided that 3 to 9, preferably 6 groups of further projections arranged one behind the other in the longitudinal direction are provided over the circumference of the rotary tube.

The groups of further projections arranged one behind the other essentially parallel to the longitudinal axis of the rotary tube provided according to the invention can be arranged over the entire length of the preheating zone. According to a particularly advantageous embodiment of the invention, it is provided that the groups of projections extend over a fifth to a third of the overall length of the rotary tube.

According to a further particularly advantageous embodiment of the invention, it can further be provided that at least one additional projection, preferably a plurality of additional projections, is provided in the inlet zone of the rotary tube, the at least one additional projection having at least one sliding surface inclined with respect to the longitudinal axis of the rotary tube for conveying the material to be burned from the inlet zone to the preheating zone.

This takes advantage of the fact that the material to be burned comes to rest on the at least one sliding surface of the material bed due to the rotation of the at least one additional projection through the material bed and, due to the particular inclination of the sliding surface, slides rapidly towards the preheating zone by gravitational force. It goes without saying that the direction of rotation of the rotary tube and the orientation of the sliding surface in the circumferential direction of the rotary tube must be adapted accordingly to one another. At the same time, this also considerably reduces the formation of dust, since grinding of the material to be burned against the wear rings of the kiln inlet seal as a result of a rearward movement of the material in the inlet zone is effectively prevented.

Different angles of inclination can be provided on the sliding surface of the at least one further projection. According to an advantageous embodiment of the invention, the sliding surface of the at least one further projection has an inclination with respect to the longitudinal axis of the rotary tube of 15° to 70°. Particularly good results were achieved at an angle of inclination between 40° and 50°, especially around 45°.

The at least one additional projection can also contain a refractory material. These can be various high-temperature resistant materials, as are known per se from the prior art. Concrete, in particular refractory concrete, has proven to be particularly suitable.

In experiments by the applicant, different geometries have been found to be suitable for the at least one additional projection. Prismatic geometries are preferred, in particular in the form of a straight prism with a triangular base, especially in the form of a right triangle, in which the at least one sliding surface is formed by the hypotenuse of the right triangle.

The height of the at least one additional projection, i.e. the extension in the radial direction with respect to the cylindrical rotary tube, is important for a particularly good effectiveness in relation to the conveyance of the material to be burned from the inlet zone in the direction of the preheating zone. This can be 100 mm to 500 mm, preferably 150 mm to 250 mm, typically approximately 200 mm. This ensures that a sufficient amount of material rests on the at least one sliding surface of the at least one additional projection and subsequently slides in the direction of the preheating zone due to the inclination of the sliding surface. Furthermore, it can be provided that the at least one additional projection has a length of 100 mm to 2000 mm, preferably 350 mm to 450 mm, typically approximately 400 mm, which extends substantially parallel to the longitudinal axis of the rotary tube.

The at least one additional projection can be fastened to the inner rotary kiln casing by means of a welded metallic anchor.

According to a particularly advantageous embodiment of the invention, it is provided that a plurality of additional projections is provided in the inlet zone of the rotary tube, the additional projections being grouped in a row such that the respective sliding surfaces of the additional projections form a common sliding surface for the material to be burned. This results in a particularly effective conveyance of the material to be burned from the inlet zone of the rotary tube to its preheating zone.

Because a common sliding surface is provided by a plurality of additional projections lined up as a group, on the one hand a particularly long sliding surface can be provided which extends practically along the entire extent of the inlet zone. At the same time, in the event of damage to, for example, an individual additional projection from the group of additional projections arranged in a row, these can be specifically replaced without having to dismantle the overall construction. The plurality of additional projections are preferably essentially identical to one another.

A further improvement in the conveyance of the material to be burned through the inlet zone of the rotary tube is achieved by arranging 2 to 8, in particular 4 to 6 and very particularly preferably 5 additional projections or groups of additional projections arranged in a row over the circumference of the rotary tube.

According to a further aspect of the present invention, the object mentioned at the outset is achieved with a method for burning carbonate-containing material, in particular limestone or dolomite, which comprises the following steps:
  introducing the carbonate-containing material into the rotary tube of a rotary kiln as described herein,
  burning the carbonate-containing material, the carbonate-containing material moving through the rotary tube from the inlet zone through the preheating zone and the combustion zone to the outlet zone, the rotary tube rotating in a direction of rotation,
  conveying the burnt material through the outlet zone, the at least one projection arranged in the outlet zone combing the burnt material in order to improve cooling.

The advantages mentioned above apply accordingly to the method. In particular, an efficient burning process is proposed, which is characterized by a high material throughput through the rotary kiln, a uniformly high product quality for the burnt material as a result of complete calcination, and by being easy to carry out. In particular, thorough intermixing of the burnt material is achieved in the outlet zone of the rotary tube, so that all of the burnt material starts to cool evenly already in the outlet zone. As a result, the following system components, in particular coolers and transport channels, but in particular the downstream conveyor belts, are protected against temperature peaks.

BRIEF DESCRIPTION OF THE DRAWINGS

The invention is explained in more detail below in reference to a drawing depicting an exemplary embodiment. Shown are.

DESCRIPTION OF THE INVENTION

Figure 1:
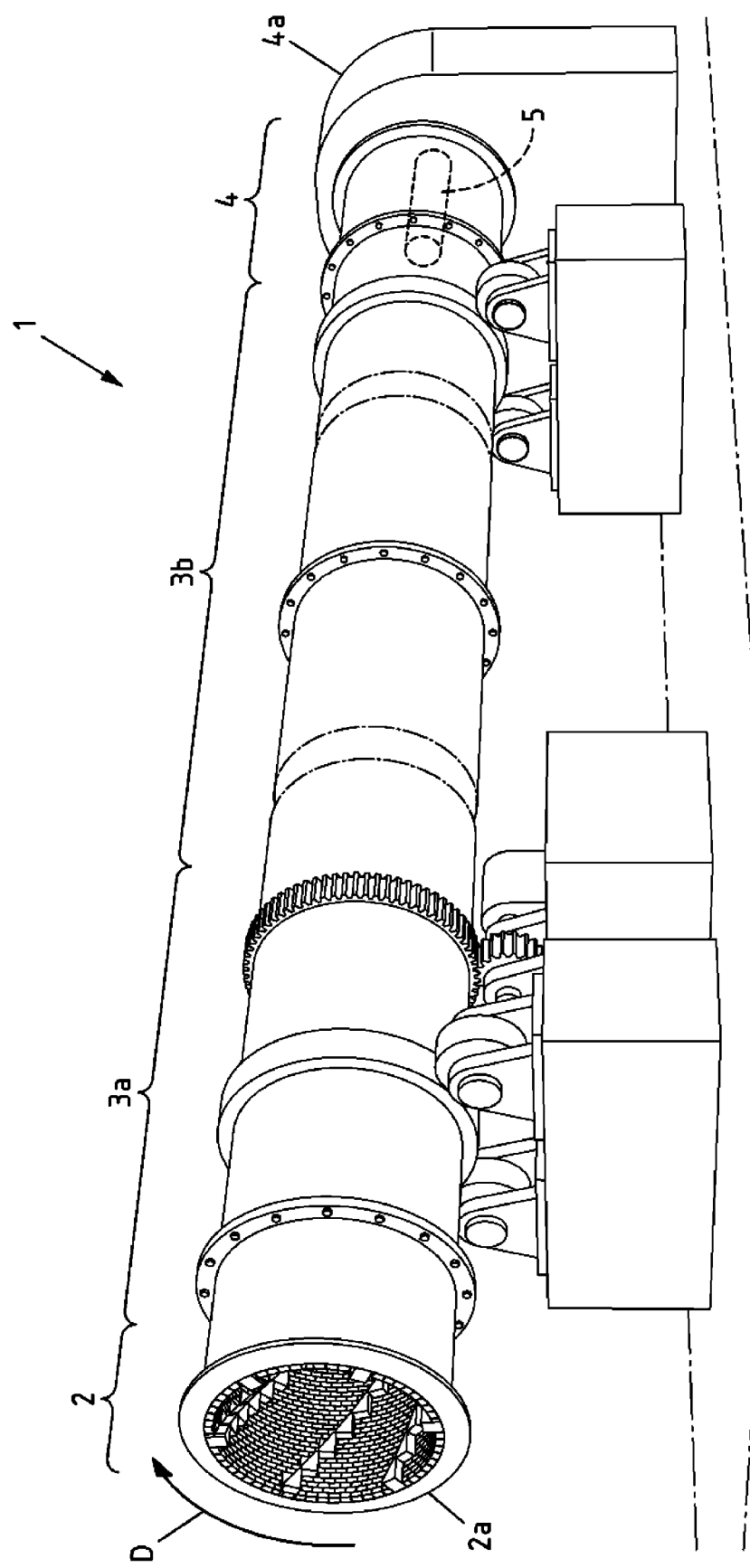
FIG. 1 the rotary tube of a rotary kiln in a perspective view.

In FIG. 1, the rotary tube 1 of a rotary kiln is shown with conventional mounting and drive components, which will not be discussed in more detail below. The rotary tube 1 comprises an inlet end 2a—shown here on the front—and a rear outlet end 4a. Along the longitudinal extension of the rotary tube 1, the rotary tube 1 comprises an inlet zone 2, a preheating zone 3a (also called "transition zone"), a combustion zone 3b and an outlet zone 4 (see also FIGS. 2 and 5) in relation to the material feed, combustion and material discharge process. Arranged in the region of the outlet end 4a is a burner lance 5, by means of which a flame protruding into the rotary tube 1 is generated during operation of the rotary kiln. In one exemplary embodiment, the rotary tube 1 has an overall length of approximately 90 m, the length of the inlet zone 2 being approximately 2 m, that of the preheating zone 3a approximately 32 m, the length of the combustion zone 3b being approximately 53 m and that of the outlet zone 4 about 3 m. It goes without saying that these lengths are to be understood purely as examples. Different sized rotary tubes are also known from the prior art. The highest temperatures generated by the burner flame are achieved in the operation of the rotary kiln in the combustion zone 3b and are approximately 1500-1600° C., so that the predominant part of the calcination reaction takes place in this zone.

Figure 2:
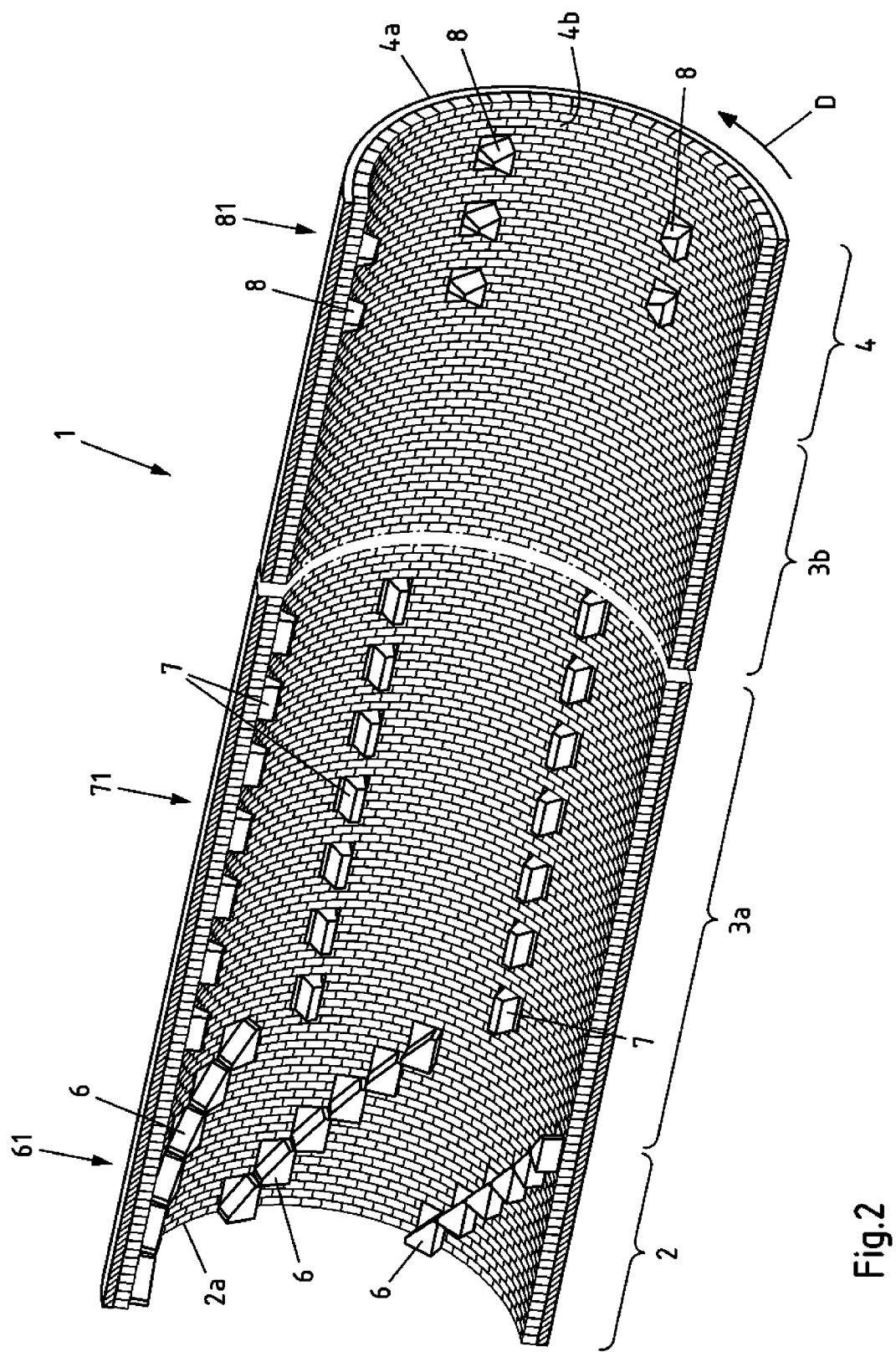
FIG. 2 the rotary tube of FIG. 1 in truncated perspective longitudinal sectional view, FIG. 3 an enlarged section of the outlet zone of the rotary tube of FIG. 1 in a perspective longitudinal sectional view, FIG. 4 a projection in the outlet zone of the rotary tube of FIG. 1 in a perspective view, FIG. 5 a two-dimensional truncated view of the "unrolled" kiln inner wall of the rotary tube of FIG. 2 in a starkly schematic form, FIG. 6 an enlarged section of the preheating zone of the rotary tube of FIG. 1 in a perspective longitudinal sectional view, FIG. 7 a projection in the preheating zone of the rotary tube of FIG. 1 in a perspective view, FIG. 8 an enlarged section of the inlet zone of the rotary tube of FIG. 1 in a perspective longitudinal sectional view, and FIG. 9 a projection in the inlet zone of the rotary tube of FIG. 1 in a perspective view.
Figure 3:
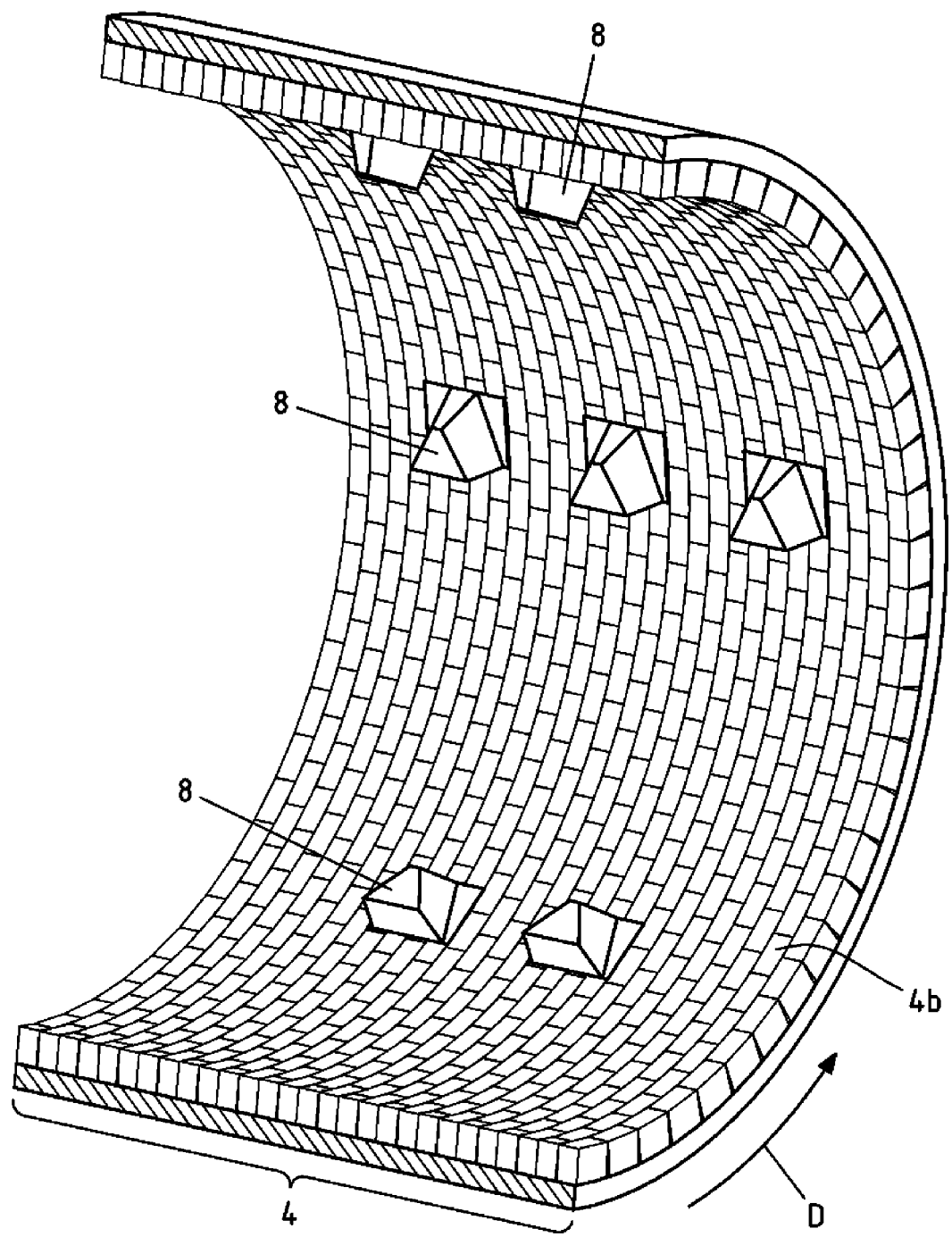
Figure 4:
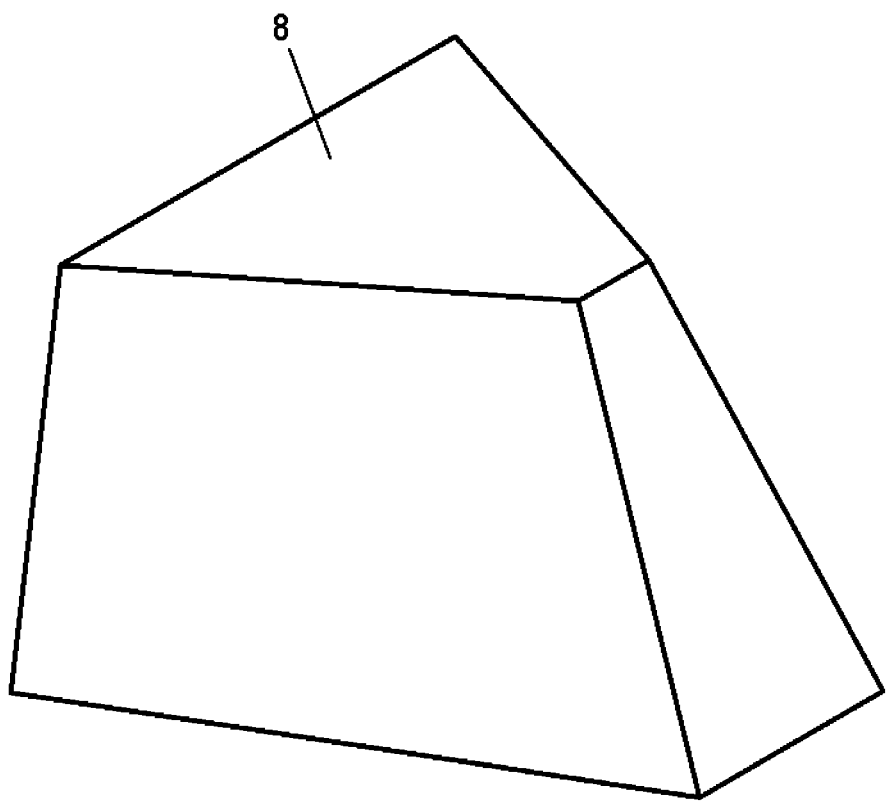

As shown in the perspective longitudinal sectional view of the rotary tube 1 in FIG. 2, the rotary tube 1 in the outlet zone 4 of the rotary tube 1 comprises a plurality of projections 8, which are arranged in groups 81 over the circumference of the rotary tube 1. Each projection 8 in turn has a contour tapering in the direction of rotation D of the rotary tube 1, as is shown in more detail in the detailed drawings of FIGS. 3 and 4. Specifically, the tapering contour of the projections 8 (also referred to as "blades" in technical terms) is formed as a truncated pyramid with the base area of an isosceles acute-angled triangle (see FIG. 4), the acute angle leading in the direction of rotation D of the rotary tube 1 and being slightly blunted for reasons of stability. This shape of the projections 8 makes it possible to comb through the burned material in the outlet zone 4 in the manner of a plow, with intensive intermixing occurring. This in turn means that no temperature spikes occur in the material, so that the risk of temperature-related damage that the burnt material causes to the components (not shown) downstream of the rotary tube 1, in particular the cooling units, is minimized. In order to ensure maximum temperature resistance, the projections 8 in the present case contain refractory concrete. Furthermore, each projection 8 is welded to the inner wall of the rotary tube 1 by means of a metallic anchor.

Figure 5:
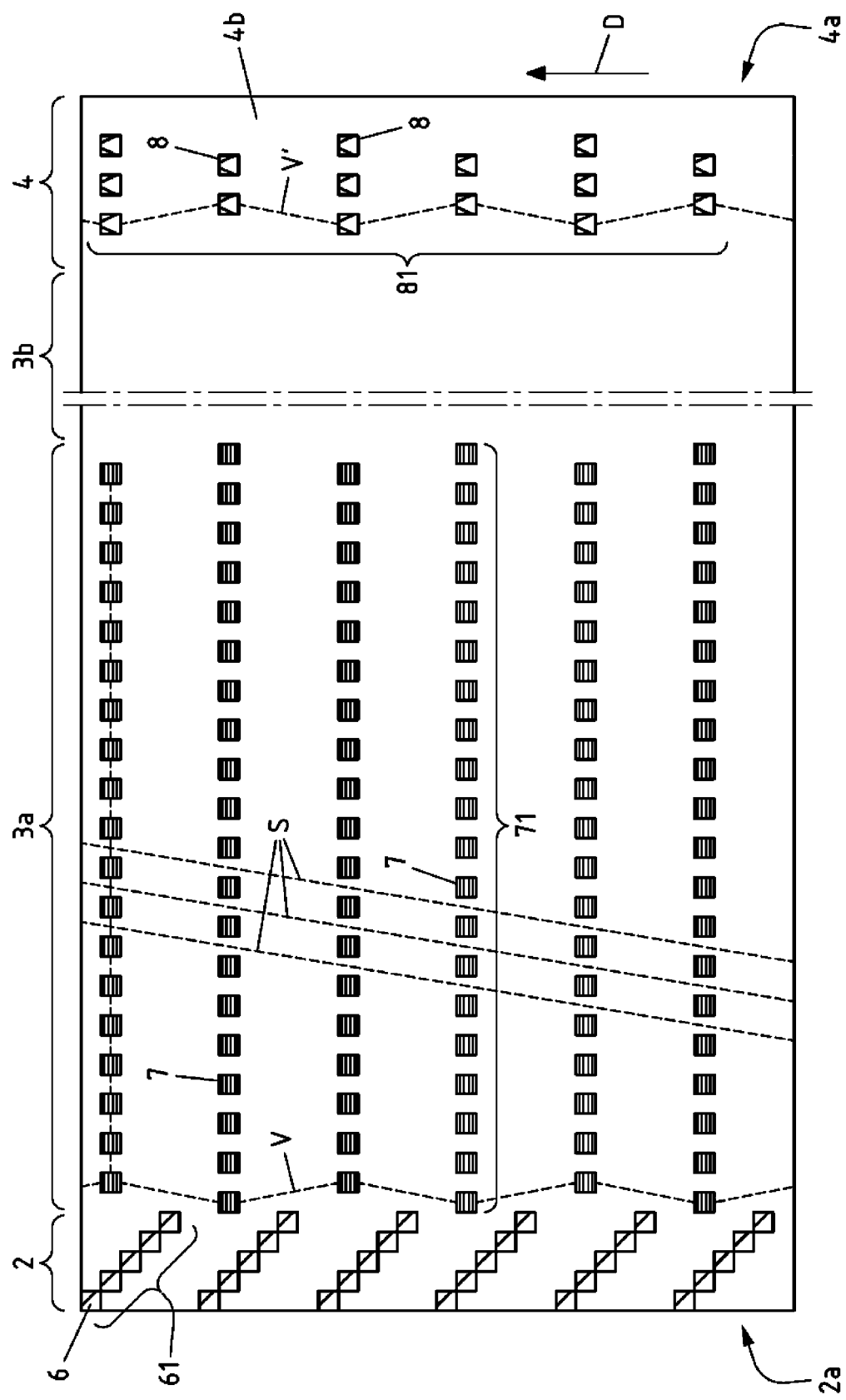

As can be seen in particular in the two-dimensional representation of the "unwound" open inner wall of the rotary tube 1 (FIG. 5), a group 81 of projections 8 comprises six projections, which in the present case are alternately offset in the longitudinal direction of the rotary tube 1. This is indicated in FIG. 5 by a zigzag line V'. Furthermore, as shown in FIG. 5, a plurality of groups 81—in the present case three—of projections 8 are arranged one behind the other in the longitudinal direction of the rotary tube 1, the group which is marginal with respect to the outlet end 4a of the rotary tube 1 comprising only 3 projections 8. In particular, the alternating offset of the projections 8 of a group 81 further increases the effectiveness of the intermixing of the burnt material in the outlet zone 4.

An edge section 4b that is approximately 400 mm wide is provided between the outlet end 4a of the rotary tube 1 and the peripheral group 81 of only three projections 8, in which edge section no projection 8 is arranged, so that the original discharge position into the cooling chute is not changed by the projections 8.

Figure 6:
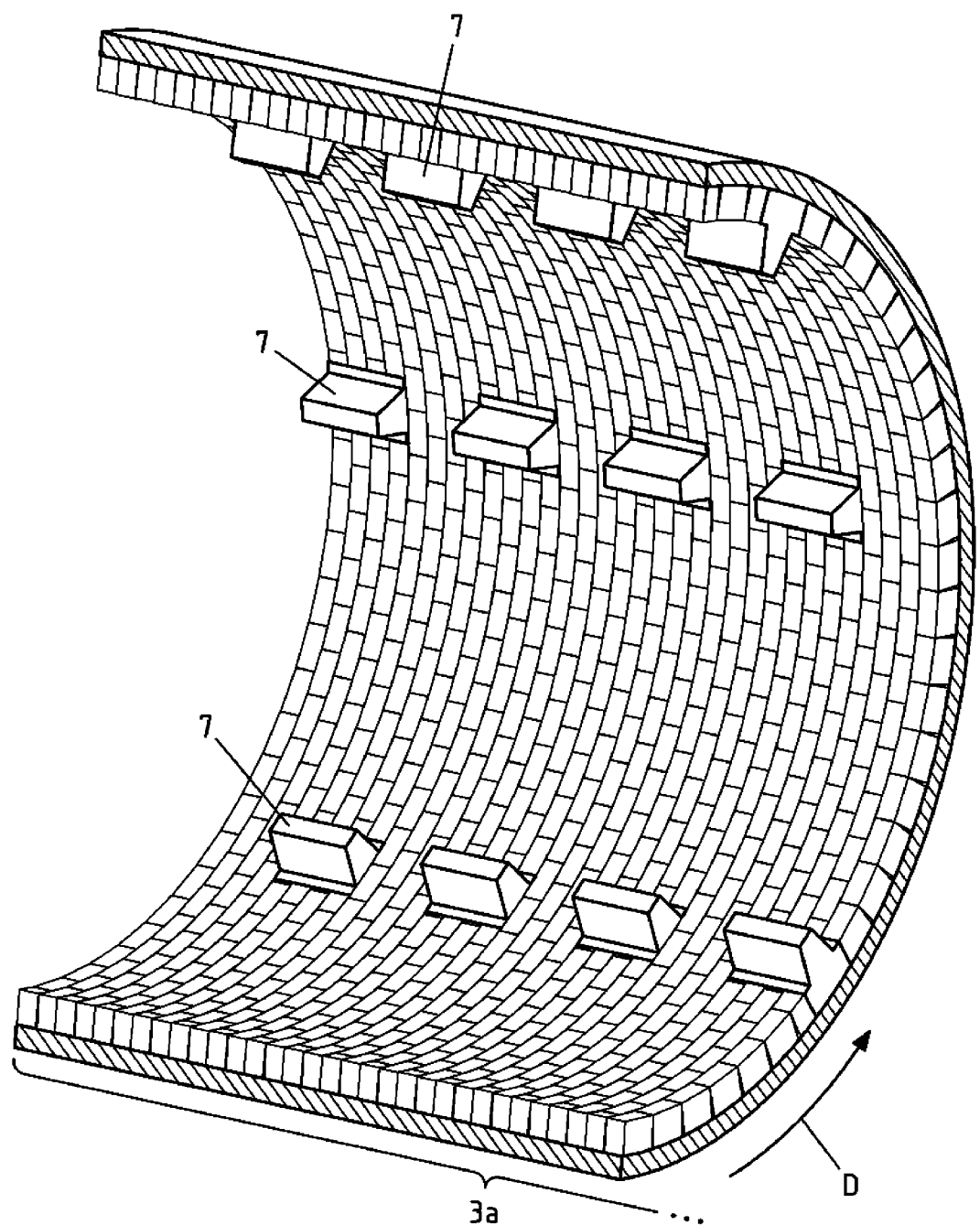
Figure 7:
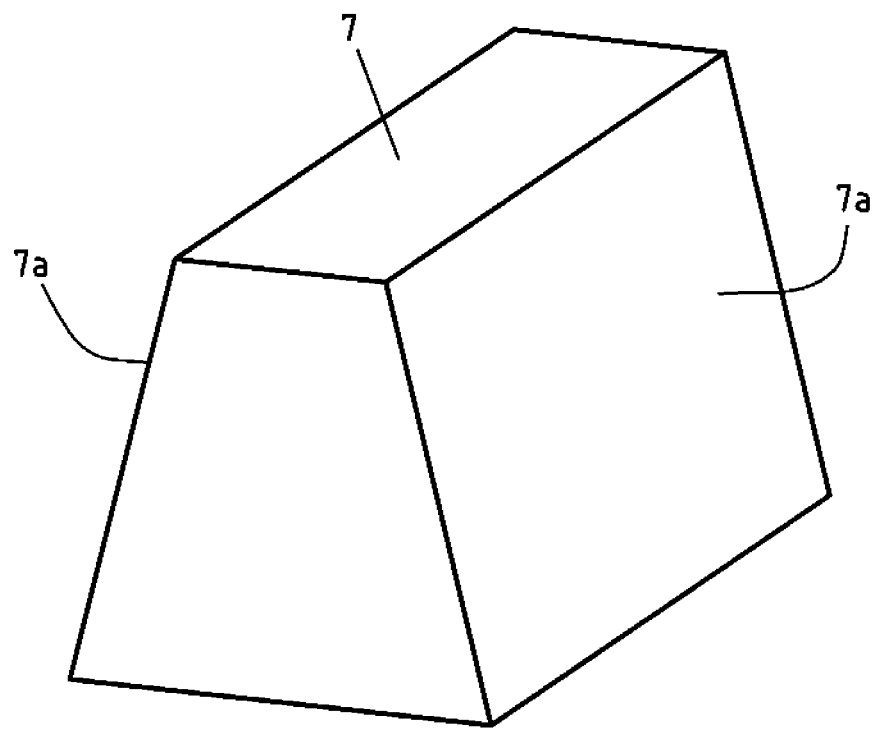
Figure 8:
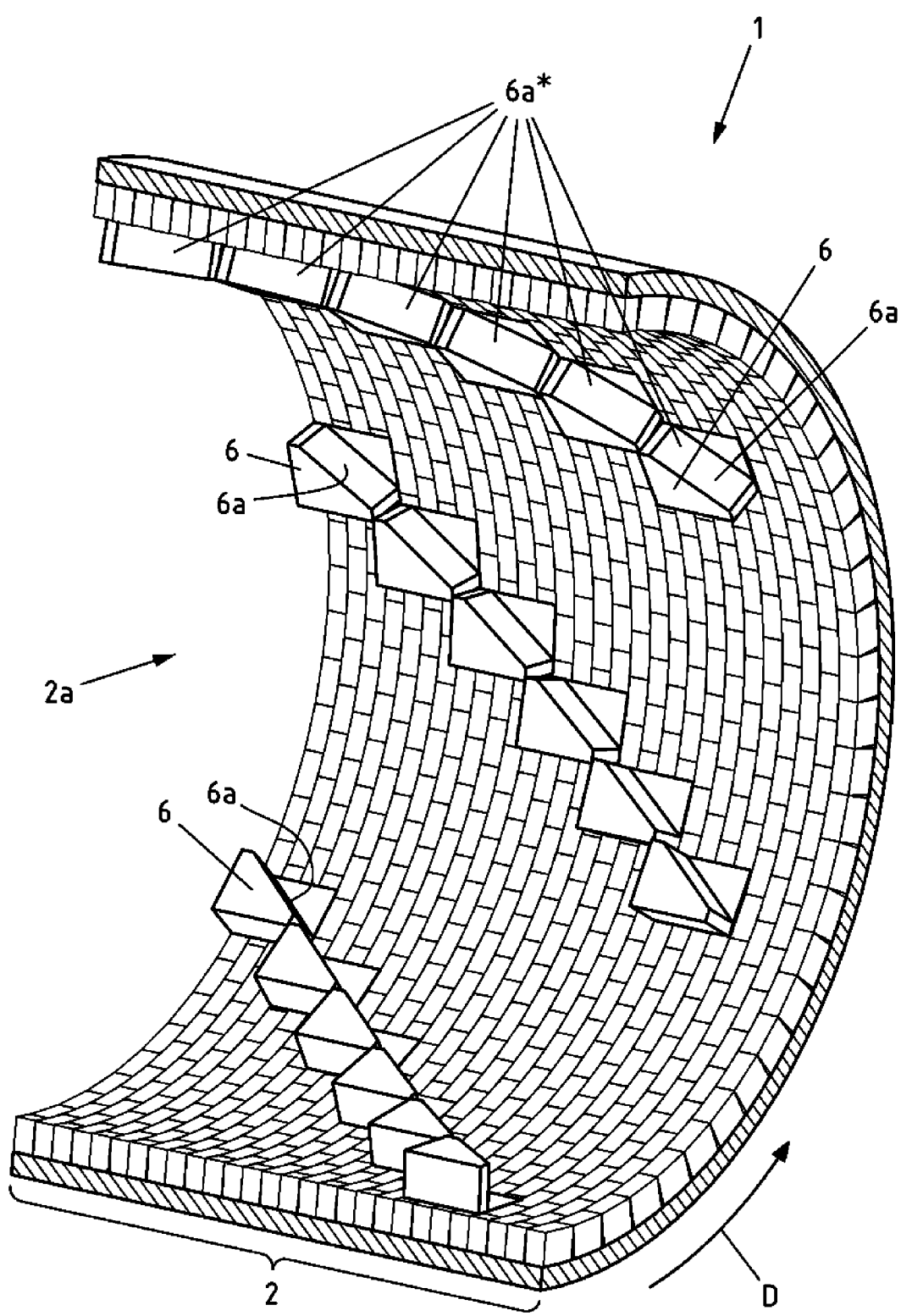

As further shown in FIG. 5, a plurality of further projections 7 (technically "lugs") are provided in the preheating zone 3a of the rotary tube 1, the further projections 7 being arranged as groups 71, one behind the other, essentially parallel to the longitudinal axis of the rotary tube 1. In this case, further projections 7 of adjacent groups 71, which are arranged adjacent to one another in the circumferential direction of the rotary tube 1, are alternately offset with respect to one another in the longitudinal direction of the rotary tube 1, as represented by the zigzag line V. This alternately offset arrangement forms spiral transport paths S (shown in FIG. 5 as slanted lines) for the material to be burned in the preheating zone 3a. These serve to transport the material to be burned faster and with improved mixing through the preheating zone 3a with constant use of energy. They also serve to reduce the formation of dust in the preheating zone 3. The groups 71 of further projections 7 arranged one behind the other in the longitudinal direction of the rotary tube 1 can extend over a third to a fifth of the overall length of the rotary tube. As shown in the enlarged view of FIGS. 6 and 7, these further projections 7 ("lugs") have the shape of a trapezoidal prism with inclined leg surfaces 7a and a length of approximately 400 mm in the present case and a height of approximately 200 mm in the present case. The angle of inclination of the leg surfaces 7a with respect to the lower trapezoidal base is approximately 76° in the present case. The trapezoidal design of the projections 7 ensures that the material intermixed by the projections 7 in the preheating zone 3a during kiln operation does not fall off the projections 7 with increased dust formation, but rather slides down along the leg surfaces 7a.

In the longitudinal sectional view of FIG. 2 and the two-dimensional view of FIG. 5, it can also be seen that a plurality of additional projections 6, which have a specific shape and are arranged in rows as groups 61 in a stepped form, are arranged in the inlet zone 2 of the rotary tube 1 as described below. The additional projections 6 are also referred to in technical terms as "displacers."

Figure 9:
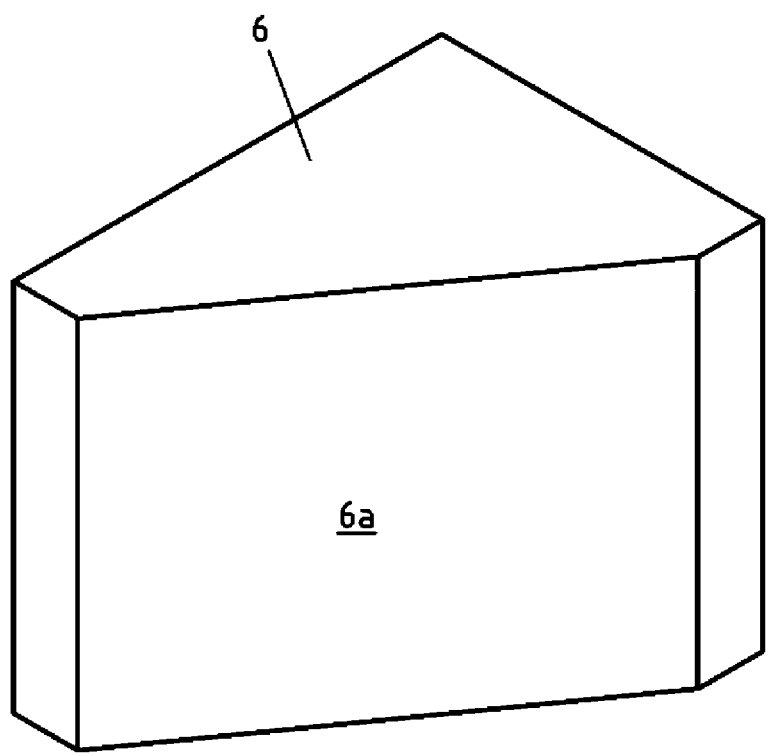

As shown in FIGS. 1, 2, 5 and 8 and 9, the additional projections 6, in this case six of them, that are arranged in rows as a group 61, are essentially identical to one another and, according to FIG. 9, substantially have the shape of a triangular prism with the base of a right, isosceles triangle, the acute angles of the triangle being blunted for reasons of stability. Each additional projection 6 has a sliding surface 6a, which is arranged inclined with respect to the longitudinal axis of the rotary tube 1. An angle of inclination of approximately 45° is preferably selected. As mentioned, the additional projections 6 are arranged in rows in a stepped form in such a way that the individual sliding surfaces 6a of the additional projections 6 form a common sliding surface 6a*, which in the present case is also inclined at an angle of approximately 45° with respect to the longitudinal axis of the rotary tube 1.

Furthermore, the sliding surfaces 6a of the additional projections 6 and, accordingly, the common sliding surface 6a*, are oriented relative to the direction of rotation D of the rotary tube 1 in such a way that during operation of the kiln the material to be burned comes to rest on the sliding surfaces 6a, 6a* and, on the basis of the selected Inclination of the sliding surfaces 6a, 6a* with respect to the longitudinal axis of the rotary tube 1, slides rapidly in the direction of the preheating zone 3 by gravitational force without any undesirable rearward movement of the material to be burned in the direction of the inlet end 2a.

As shown in particular in FIGS. 1 and 5, six groups 61 of further projections 6 lined up in a row are provided distributed over the circumference on the inner wall of the rotary tube 1.

The invention claimed is:

1. A rotary kiln for burning carbonate-containing material comprising:
    a rotary tube having an inlet end for feeding the material to be burned and an outlet end for discharging burnt material; and
    a burner unit arranged in a region of the outlet end, wherein the rotary tube comprises:
        an inlet zone at the inlet end;
        an outlet zone at the outlet end;
        a preheating zone;
        a combustion zone arranged between the inlet zone and the outlet zone in a direction of transport of the material;
        a first plurality of projections arranged in the outlet zone of the rotary tube, wherein each projection of the first plurality of projections has a contour tapering in a direction of rotation of the rotary tube;
        a second plurality of projections arranged in the inlet zone of the rotary tube, wherein each projection of the second plurality of projections has at least one sliding surface inclined in a longitudinal direction of the rotary tube; and
        a third plurality of projections arranged in the preheating zone of the rotary tube, wherein each projection of the third plurality of projections is tapered in a circumferential direction of the rotary tube, and
    wherein an edge section is provided at the outlet end of the rotary tube, and no projections are arranged in the edge section.

2. The rotary kiln according to claim 1, wherein at least some of the first plurality of projections contain a refractory material.

3. The rotary kiln according to claim 1, wherein at least some of the first plurality of projections are V-shaped.

4. The rotary kiln according to claim 1, wherein at least some of the first plurality of projections have a prismatic geometry.

5. The rotary kiln according to claim 1, wherein at least some of the first plurality of projections are blunted or rounded in the direction of rotation of the rotary tube.

6. The rotary kiln according to claim 1, wherein
    at least some of the first plurality of projections have a height in a radial direction in relation to the rotary tube of between 50 mm and 500 mm, and/or
    at least some of the first plurality of projections have a length in a circumferential direction of the rotary tube of between 50 mm and 2000 mm, and/or
    at least some of the first plurality of projections have a maximum width in a longitudinal direction of the rotary tube of between 50 mm and 600 mm.

7. The rotary kiln according to claim 1, wherein the at least some of the first plurality of projections are attached to an inner wall of the rotary tube by a metallic anchor.

8. The rotary kiln according to claim 1, wherein the first plurality of projections are arranged in groups of 1 to 10 distributed around the circumference of the rotary tube, wherein adjacent projections of each group of projections are arranged alternately offset in a longitudinal direction of the rotary tube, and/or a plurality of groups of projections are arranged one behind the other in the longitudinal direction of the rotary tube.

9. The rotary kiln according to claim 1, wherein the third plurality of projections are arranged in groups with each group comprising a plurality of projections arranged one behind the other in a longitudinal direction of the rotary tube, and wherein each of the groups is substantially parallel to a longitudinal axis of the rotary tube.

10. The rotary kiln according to claim 9, wherein the third plurality of projections of adjacent groups of projections arranged adjacent to one another in a circumferential direction of the rotary tube are arranged alternately offset in the longitudinal direction of the rotary tube, such that spiral-shaped transport paths for the material are formed in the preheating zone.

11. The rotary kiln according to claim 9, wherein at least some of the projections of the second plurality of projections have a prismatic geometry.

12. The rotary kiln according to claim 9, wherein groups of the projections of the second plurality of projections extend over a fifth to a third of the overall length of the rotary tube.

13. The rotary kiln according to claim 1, wherein the second plurality of projections are arranged in groups with respective sliding surfaces of projections in each group forming a common sliding surface.

14. The rotary kiln of claim 1, wherein plurality of projections are arranged in groups, each group comprising a plurality of projections and extending around a circumference of the rotary tube,
    in each group, each projection is offset in a longitudinal direction of the rotary tube from adjacent projections, and
    in the longitudinal direction, each projection in a first group is aligned with and spaced apart from a projection in a second adjacent group.

15. A method for burning carbonate-containing material comprising the following steps:
    introducing the carbonate-containing material into the rotary tube of a rotary kiln according to claim 1;
    burning the carbonate-containing material while rotating the rotary tube to move the carbonate-containing material through the rotary tube from the inlet zone through the preheating zone and the combustion zone to the outlet zone; and
    conveying the burnt material through the outlet zone with at least one projection arranged in the outlet zone combing through the burnt material to improve cooling.

* * * * *

UNITED STATES PATENT AND TRADEMARK OFFICE
CERTIFICATE OF CORRECTION

Page 1 of 1

PATENT NO. : 12,405,060 B2
APPLICATION NO. : 18/280377
DATED : September 2, 2025
INVENTOR(S) : Carsten Kaczinski It is certified that error appears in the above-identified patent and that said Letters Patent is hereby corrected as shown below:

In the Claims

Column 10, Line 38, Claim 14, after "wherein" insert -- the third --

Signed and Sealed this
Twenty-eighth Day of October, 2025

John A. Squires
*Director of the United States Patent and Trademark Office*